May 19, 1931.  J. V. GIESLER  1,806,530
TEMPERATURE REGULATOR
Filed Dec. 6, 1928  3 Sheets-Sheet 1

Inventor
Jean V. Giesler.
By Cameron, Kerkam and Sutton
Attorneys

May 19, 1931.  J. V. GIESLER  1,806,530
TEMPERATURE REGULATOR
Filed Dec. 6, 1928   3 Sheets-Sheet 2
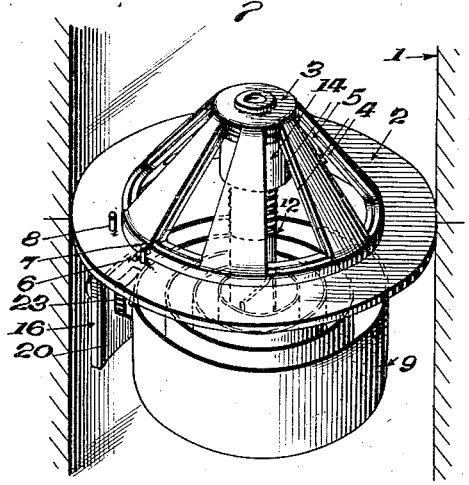
Fig. 4.
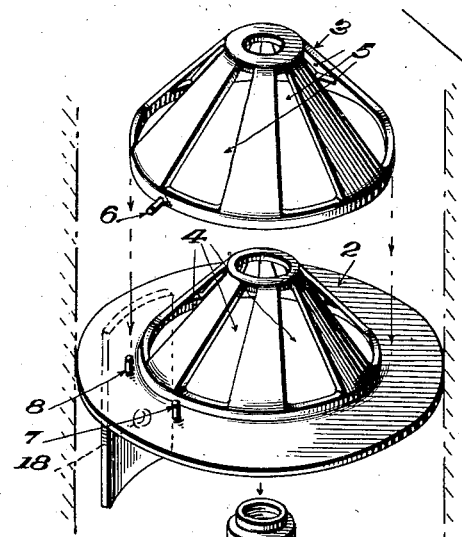
Fig. 6.
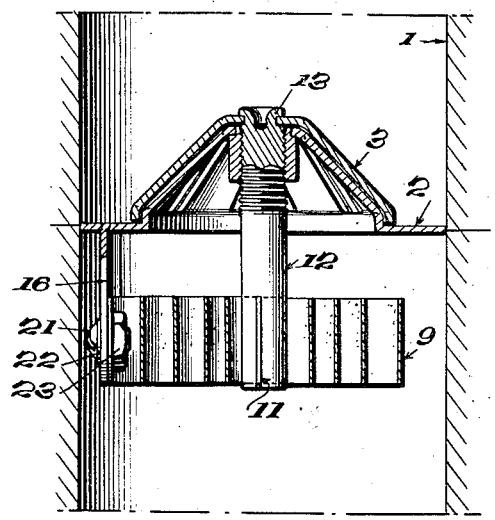
Fig. 5.
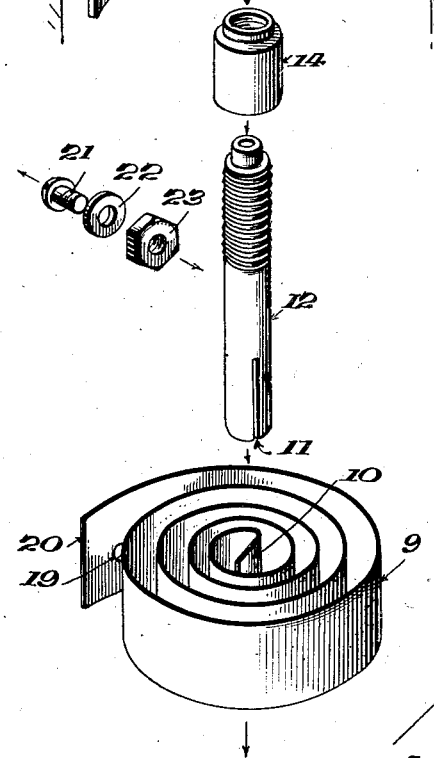
Inventor
Jean V. Giesler.
By Cameron, Kerkam and Sutton
Attorneys May 19, 1931. J. V. GIESLER 1,806,530
TEMPERATURE REGULATOR
Filed Dec. 6, 1928   3 Sheets-Sheet 3

Inventor
Jean V. Giesler.
By Cameron, Kerkam and Sutton.
Attorneys

Patented May 19, 1931

1,806,530

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

TEMPERATURE REGULATOR

Application filed December 6, 1928. Serial No. 324,140.

This invention relates to thermostatic valve units, and more particularly to a thermostatic valve unit adapted to be inserted in the water line of an automobile cooling system, to control the flow of the cooling fluid therethrough in accordance with the temperature of said fluid.

One of the objects of the invention is to provide a self-contained thermostatic valve unit of the rotary valve type which is adapted to be installed as a unit in the water line of an automobile cooling system.

Another object of the present invention is to provide a novel thermostatic valve unit which is simple and economical, of low manufacturing cost, and both positive and reliable in operation.

Another object is to provide a thermostatic valve unit adapted for use as a water line regulator wherein the valve action is substantially unaffected by water pressure.

A further object is to provide a thermostatic valve unit embodying a rotary disk valve wherein all friction between the valve disk and its seat member is eliminated and yet a tight seal is effected.

A further object is to provide a thermostatic valve unit of the rotary type having novel means for increasing the maximum effective area of valve openings.

Other objects will appear hereinafter as the description of the invention proceeds.

Several embodiments of the invention have been illustrated in the accompanying drawings, but it is to be expressly understood that said drawings are for purposes of illustration, and are not to be construed as a definition of the limits of the invention, reference being had to the appended claims for this purpose.

In said drawings,—

Fig. 4 shows another embodiment of the invention;

Fig. 5 is a sectional elevation of Fig. 4;

Fig. 6 is an expanded perspective view of the embodiment shown in Fig. 4;

While the invention is particularly adapted for use as a water line regulator for the cooling system of internal combustion engines and its application to such a system is described hereinafter, it will be understood that the invention is capable of wider application and is not limited to this use.

Figure 1:
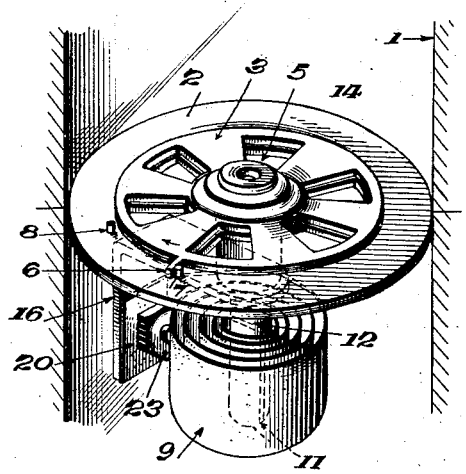
Fig. 1 is a perspective view of one embodiment of the invention.
Figure 2:
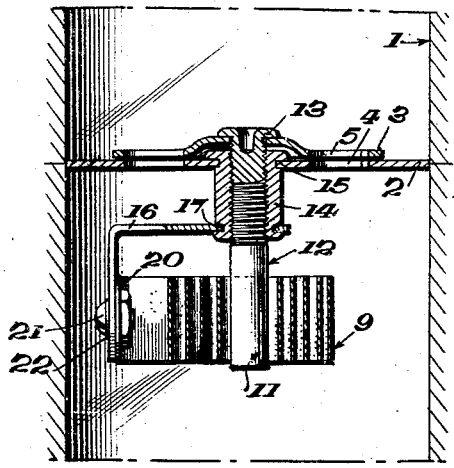
Fig. 2 is a sectional elevation of Fig. 1.
Figure 3:
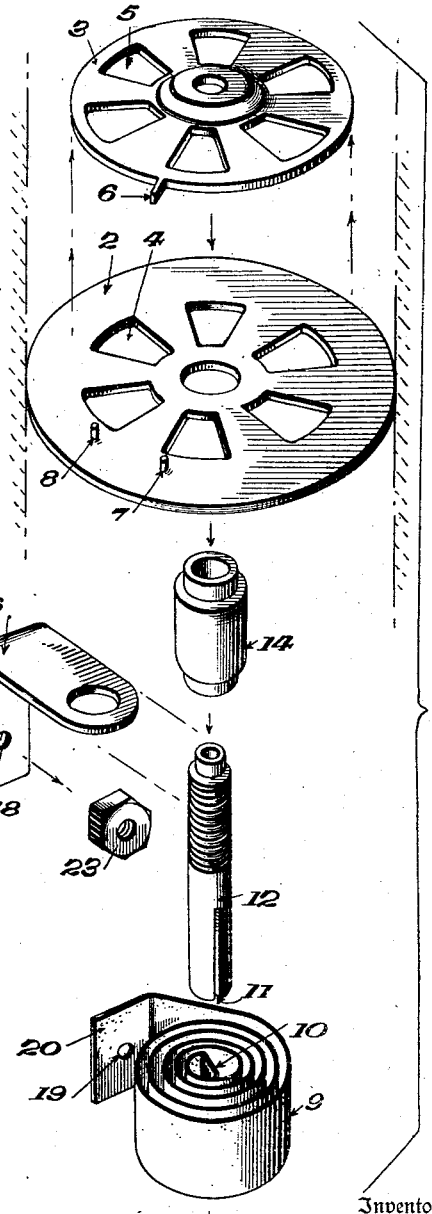
Fig. 3 is an expanded perspective view of the embodiment of Fig. 1.

Referring now to Figs. 1 to 3, inclusive, 1 designates a pipe or conduit, shown diagrammatically, through which the flow of a fluid is to be controlled in accordance with its temperature. To this end a thermostatic valve unit is positioned in the pipe 1, said valve, in the form shown, comprising relatively rotatable disks 2 and 3. Preferably, one of said disks, such as the disk 2, is of sufficient diameter to extend completely across the pipe 1, and may be mounted therein in any suitable manner. The disk 3 is preferably arranged coaxially relative to the disk 2, and said disks are provided with similarly arranged apertures 4 and 5, respectively. When the apertures 4 and 5 are in register, the valve is completely open, as shown in Fig. 1, and when the disk 3 is rotated in the direction of the arrow shown in Fig. 1, the valve openings are gradually closed. Any suitable means may be employed for limiting the extent of relative rotation of the two disks, and in the form shown, a stop member 6 is provided on the periphery of the disk 3 and limiting stops 7 and 8 on the disk 2 limit the movement of the disk 3 relative to the disk 2 in opening and closing directions, respectively.

Suitable means are provided whereby relative rotation between the disks may be caused by and controlled in accordance with changes in the temperature of the fluid in the pipe 1. While any suitable type of thermostat may be employed for this purpose, it is preferred to use a thermostat of known type comprising a coiled metallic band 9, composed of two metals having different coefficients of expansion. Changes in temperature will cause the coil to wind up or unwind, as is well known in the art, and this action may be employed to cause relative rotation between disks 2 and 3. While said thermostat may be operatively connected to the valve disks in any suitable manner, it is preferred to maintain the outer end of the coil stationary and to connect the inner end thereof with the disk 3. To this end the inner end of the coil is provided with a bent portion 10 adapted to engage in a slot 11 formed in a valve stem 12, to the outer end of which the valve disk 3 is attached at 13 in any suitable manner, as by soldering or brazing. The outer end of the coil may be suitably attached to any part of the apparatus which is stationary relative to the valve disk 3, but it is preferred to secure the same to the relatively stationary valve disk 2. Referring now to the drawings, valve disk 2 is preferably provided at its center with a hub 14, to which it is secured at 15 in any suitable manner as by soldering or brazing, and the valve stem 12 passes through said hub 14, preferably having threaded engagement therewith for a purpose to be described hereinafter. As shown, the outer end of the thermostatic coil is held stationary with respect to valve disk 3 by means of an L-shaped bracket 16 secured at 17 in any suitable manner to the hub 14. For attaching the end of the thermostat coil to said bracket, the latter may be provided with a hole 18 adapted to register with a hole 19 in a bent end portion 20 of said coil, and a screw 21 having a washer 22 passes through the two holes and is secured by a nut 23.

It has been found that with valves of this character, if the disks are made to engage tightly enough to form a close seal, considerable friction results between the disks, particularly where the pressure of the fluid is in such direction as to force them together. Friction and rubbing between the disks are particularly objectionable where the power available for opening and closing the valve is relatively small, and may seriously interfere with the proper operation. In the present invention, these disadvantages are obviated by the threaded engagement between the valve stem 12 and the hub 14. These threads are so arranged that when the valve is opened, as shown in Figs. 1 and 2, the valve disk 3 is bodily displaced away from the disk 2, leaving a clearance therebetween and permitting free operation of the valve. On the other hand, when the valve disk 3 is rotated in the direction of the arrow in Fig. 1 to close the valve, the threads draw the disks together and form a tight seal in closed position. The pitch of the threads on the valve stem 12 and hub 14 may be suitably adjusted to give the required amount of lift of the valve disk 3, depending upon the particular conditions encountered.

In a valve such as shown in Figs. 1 to 3, the area of the ports 4 and 5 is preferably slightly less than the area of the solid portions of the disks 2 and 3, in order that the valve may be completely closed, and it can never exceed one-half of the area of the disk. In some instances it may be found that the amount of valve opening thus obtained when the valve is fully open, is not sufficient to permit the required flow and in such a case the effective area of the valve opening may be increased by the means shown in the embodiment of Figs. 4 to 6, inclusive. In this embodiment, the valve disks 2 and 3 are conical in form, so that the total area of the ports is greater and a greater flow of fluid therethrough may be obtained. In this case it is preferable that the bracket 16 should be mounted on the valve disk 2 adjacent its periphery, said bracket being formed integrally with or secured in any suitable manner to said valve disk.

Figs. 7 to 10, inclusive, illustrate another means which may be employed to increase the effective area of the valve opening. In this embodiment a valve disk 24 is suitably supported in the pipe 1 and is provided with a central interiorly threaded hub 25 and a depending arm 26 to which is attached one end of a coil thermostat 27, the other end of which engages in a slot 28 formed in a valve stem 29, all substantially as described in connection with the preceding embodiments. The disk 24 is provided with spokes 30 forming therebetween apertures 31, the area of said apertures 31 being substantially greater than the area of said spokes 30. A pair of rotatable valve disks 32 and 33 are provided which are suitably adapted for rotation by means of the thermostat coil 27 so as to open and close the apertures 31. In the form shown, the disk 32 adjacent the disk 24 is provided with a hub 34 which is exteriorly threaded to engage in the hub 25 and is interiorly threaded to receive the valve stem 29. The valve disk 33 is secured in any suitable manner to the outer end of the valve stem 29, as by soldering or brazing.

It will be understood that by properly proportioning the spokes and openings in the valve disks, substantially the entire area of the ports 31 may be available when the valve is open, while at the same time the spokes of the disks 32 and 33 may be so arranged so that they act additively to completely close said ports 31. One manner in which this may be accomplished is shown in the drawings, wherein the disk 32 is provided with spokes 35, and the disk 33 with spokes 36, said spokes 35 and 36 being substantially similar to spokes 30 of the disk 24. The area of each of these spokes is preferably substantially one-half of the area of one of the ports 31, so that the area of one spoke 35 added to the area of one spoke 36 equals the area of one port 31 and the ports 31 may thus be completely closed. Preferably, however, the area of each of spokes 30, 35 and 36, is slightly greater than one-half the area of the ports 31 so that the spokes may overlap in closed position. It will be seen, however, that the spokes 36 are separated from the spokes 30 by at least the thickness of the disk 32 so that in order to effect a complete seal, the disk 33 is provided with additional narrow spokes 37 which overlap and seal the edges of the spokes 30. A stop member 38 on the disk 33 cooperates with stops 39 and 40 on the disk 24 to limit relative movement therebetween, and a depending pin 41 on the disk 33 is provided to move the disk 32 by engagement with the spokes 35 and 37 thereof, notches 42 and 43 being preferably formed in the spokes 35 and 37, respectively, and a notch 44 in the spoke 30 of disk 24, to receive said pin 41.

Figure 7:
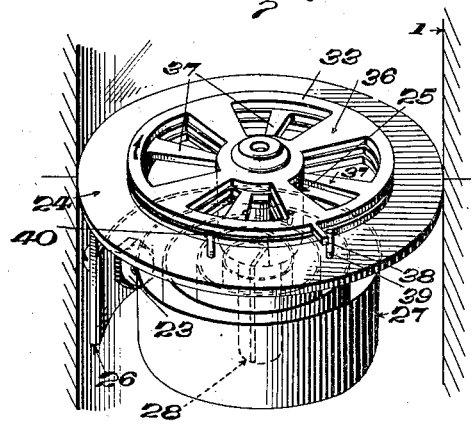
Fig. 7 is a perspective view of a further embodiment of the invention.
Figure 9:
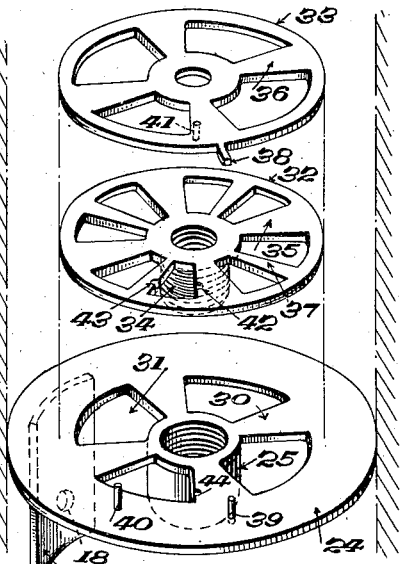
Fig. 9 is an expanded perspective view of the embodiment shown in Fig. 7.
Figure 8:
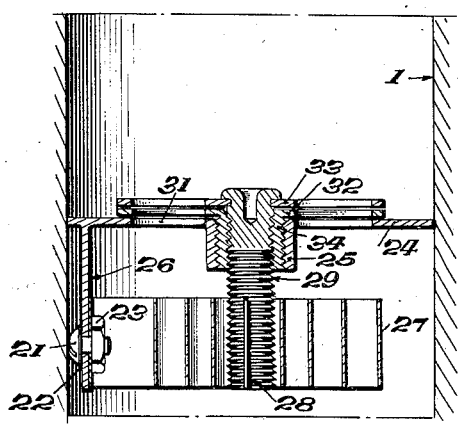
Fig. 8 is a sectional elevation of Fig. 7.
Figure 10:
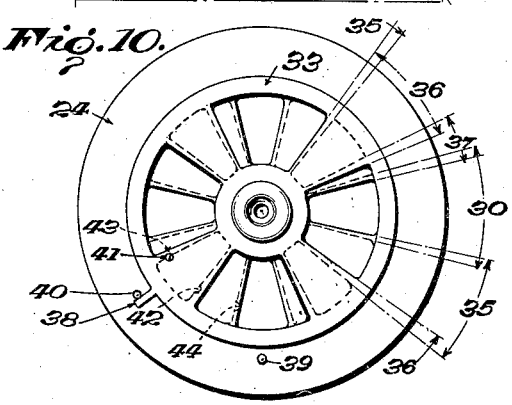
Fig. 10 is a top plan view of the embodiment shown in Fig. 7 with the valve in closed position.

The operation of this embodiment is as follows. The valve is shown in Fig. 7 in open position, wherein the stop 38 engages the stop 39, and the pin 41 engages in the notches 42 and 44, the disks being separated by a small clearance due to their threaded engagement with one another. In this position, substantially the full area of the ports 31 is available for the flow of fluid, except for the small spokes 37. As the temperature changes, the valve stem 29 will be rotated to rotate disk 33 in the direction of the arrow in Fig. 7 whereupon the pin 41 will leave the notches 42 and 44. When the disk 33 rotates, the spokes 36 will gradually restrict the area of the valve ports until pin 41 engages in notch 43 and each spoke 36 of the disk 33 covers the opening between one spoke 35 and the adjacent spoke 37 of disk 32. Owing to the threaded engagement between said disks, the same have been simultaneously drawn together so that alternate openings in disk 32 are now tightly sealed and the effective valve opening cannot be greater than the area of half of the openings in the disk 32. As the movement of the valve stem continues in the same direction, disks 32 and 33 will move as a unit relative to the disk 24, further restricting the ports 31 until the small spokes 37 of disk 32 reach the far edges of the ports 31 and the valve is completely closed. In this position stop 38 engages stop 40 and further movement of the parts in this direction is prevented. Fig. 10 shows the positions of the valve disks when the valve is closed. If the direction of rotation of the valve stem 29 is reversed, substantially the reverse operation is effected, the disk 33 first moving relative to disk 32 to uncover half of the smaller ports in the latter, and then the disks 33 and 32 will move as a unit relative to the disk 24 until the position of Fig. 7 is reached.

A thermostatic valve unit constructed according to the invention therefore comprises a compact and unitary structure, which is of light weight and small manufacturing cost, and may be readily transported and handled and removed or installed as a unit with great ease. To install the unit, it is only necessary to clamp the edge of the disk 24 between the flanges of a pipe joint, the entire assembly being supported from said plate, or other suitable means for supporting the unit may be employed. The parts are few and of simple construction, the design is rugged and serviceable, and there is nothing to get out of order or to require adjustment. At the same time the device is positive and reliable in action and effects a tight seal in closed position while at the same time eliminating friction and rubbing between the valve disks. Moreover, the action of the valve is substantially unaffected by the pressure of the fluid in the pipe in which it is installed. A thermostatic valve unit constructed according to the invention is particularly adapted for water line regulation of automobile cooling systems, and may be installed therein as explained above as a unitary, self-contained device. It is to be understood, however, that the invention is not limited to such a use, nor to use as a valve unit adapted to be installed in a fluid line, as many of its features are applicable to other conditions.

While the embodiments of the invention illustrated on the drawings have been described with considerable particularity, it is to be expressly understood that the invention is not limited thereto, as the same is capable of receiving a variety of mechanical expressions and being carried out in a variety of ways; changes may also be made in the details of construction and proportion and arrangement of the parts, without departing from the spirit of the invention. Reference is therefore to be had to the appended claims for a definition of the limits of the invention.

What is claimed is:—

1. A thermostatically controlled valve unit comprising relatively rotatable apertured valve members, a thermostat, means operatively connecting said thermostat to said members to relatively rotate the same, and means causing relative axial displacement of said members on relative rotation thereof.

2. A thermostatically controlled valve unit comprising relatively rotatable apertured valve members, means including a thermostat to cause relative rotation between said members, and cooperating means on said members to cause axial displacement of the same relative to one another on relative rotation therebetween.

3. A thermostatically controlled valve unit comprising relatively rotatable apertured valve members, a thermostat, and means including a rotatable and longitudinally displacable member operatively connecting said thermostat and one of said members.

4. A thermostatically controlled valve unit comprising relatively rotatable apertured valve members, a thermostat, a rotatable member operatively connecting said thermostat with one of said members, and means for longitudinally displacing said member on rotation thereof.

5. A thermostatically controlled valve unit comprising relatively rotatable valve parts, a valve stem for one of said parts, a thermostat adapted to rotate said stem, and means on said other valve part for longitudinally displacing said stem.

6. A thermostatically controlled valve unit comprising relatively stationary and rotatable valve disks, a valve stem secured to said rotatable disk and having threaded engagement with said stationary disk, and a thermostat adapted to rotate said stem.

7. A thermostatically controlled valve unit comprising relatively stationary and rotatable valve disks, a valve stem secured to said rotatable disk and having threaded engagement with said stationary disk, and a coil thermostat interposed between said stationary disk and said stem.

8. A thermostatically controlled valve unit comprising a valve disk having an interiorly threaded hub, a valve disk rotatable relative to said first disk, a threaded valve stem connected to said rotatable disk and extending through said hub, and a coil thermostat having its end connected to said stem.

9. A thermostatically controlled valve unit comprising relatively rotatably apertured valve members, means whereby said members have relative axial movement upon relative rotation thereof, and a coil thermostat operatively interposed between said members to rotate one relative to the other.

10. A thermostatically controlled valve unit comprising relatively rotatable valve parts, a coil thermostat operatively interposed between said parts to rotate one relative to the other, and means operatively connecting said parts to cause relative bodily displacement therebetween on relative rotation thereof.

11. A thermostatically controlled valve unit comprising relatively stationary and rotatable valve disks, a valve stem secured to said rotatable disk and having threaded engagement with said stationary disk, a thermostat adapted to rotate said stem, and cooperating stop means on said disks to limit the relative rotation thereof.

12. A thermostatically controlled valve unit comprising a valve disk having an interiorly threaded hub, a valve disk rotatable relative to said first disk, a threaded valve stem connected to said rotatable disk and extending through said hub, and a coil thermostat having its ends connected to said first named disk and said stem.

13. A thermostatically controlled valve mechanism comprising a stationary valve disk, a plurality of valve disks rotatable relatively thereto, a coil thermostat operatively connected to one of said rotatable disks and adapted to rotate the same, and means on said rotatable disk and engaging another of said rotatable disks to rotate the latter.

14. A thermostatically controlled valve unit comprising a stationary valve member, a plurality of valve members rotatable relatively thereto, a thermostat connected to said stationary member and one of said rotatable members and adapted to rotate the latter relative to said stationary member, and means on said rotatable member adapted to engage another of said rotatable members to rotate the latter.

15. A thermostatically controlled valve unit comprising a stationary valve disk, a plurality of valve disks rotatable relatively thereto, said disks having similarly disposed valve ports, a thermostat operatively connected to one of said rotatable disks and adapted to rotate the same, and a member on said rotatable disk positioned to engage another of said rotatable disks to rotate the latter after a partial rotation of said first rotatable disk.

16. A thermostatically controlled valve unit comprising a stationary valve member, a plurality of valve members rotatable relatively thereto, a thermostat operatively connected to one of said rotatable members and adapted to rotate the same, cooperating means between adjacent members to cause relative bodily displacement therebetween on relative rotation thereof, and means on said rotatable member engaging another of said rotatable members to rotate the latter.

17. A thermostatically controlled valve unit comprising a stationary valve disk, a plurality of valve disks rotatable relatively thereto, a thermostat operatively connected to one of said rotatable disks and adapted to rotate the same, interengaging threaded means between adjacent disks, and means on one of said rotatable disks engaging another of said rotatable disks to rotate the latter.

18. A thermostatically controlled valve unit comprising a stationary valve member having an interiorly threaded hub, a rotatable valve member having an exteriorly and interiorly threaded hub engaging in said first hub, a second rotatable valve member, a threaded valve stem secured to said second rotatable member and extending through said last named hub, and a thermostat operatively connected to said stem to rotate the same.

19. A thermostatically controlled valve unit comprising a stationary valve disk having an interiorly threaded hub, a rotatable valve disk having an exteriorly and interiorly threaded hub engaging in said first hub, a second rotatable valve disk, a threaded valve stem secured to said second rotatable valve disk and extending through said second named hub, a thermostat operatively interposed between said stationary disk and said stem to rotate the latter, and means on said second rotatable disk engaging said first named rotatable disk to rotate the latter.

20. A thermostatically controlled valve unit comprising a stationary valve member, a plurality of members rotatable relatively thereto, a coil thermostat operatively connected to one of said rotatable members and to said stationary member, means whereby said members have relative axial movement upon relative rotation thereof, and means between said rotatable members whereby rotation of one of said members effects rotation of another of said members.

21. A thermostically controlled valve unit comprising relatively rotatable valve parts of conical shape and having valve ports in their conical surfaces, a thermostat for rotating one of said valve parts relative to the other, and means for causing relative axial displacement of said parts on relative rotation thereof.

In testimony whereof I have signed this specification.

JEAN V. GIESLER.